July 28, 1936.  B. C. PLACE  2,048,812
FASTENER
Filed Jan. 8, 1932
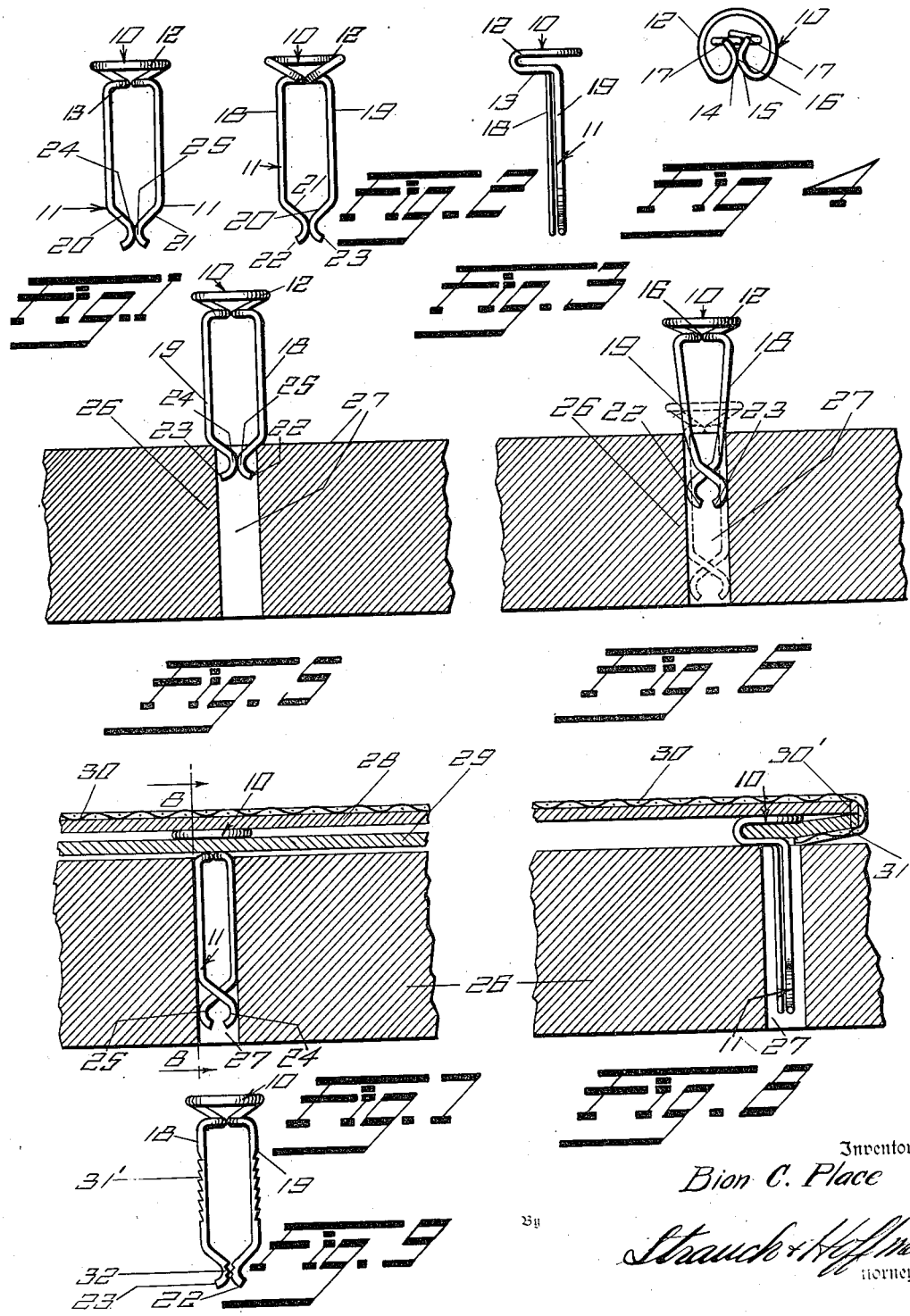
Inventor
Bion C. Place

Patented July 28, 1936

2,048,812

UNITED STATES PATENT OFFICE

2,048,812

FASTENER

Bion C. Place, Detroit, Mich., assignor of one-half to George E. Gagnier, Detroit, Mich.

Application January 8, 1932, Serial No. 585,571

12 Claims. (Cl. 24—213)

This invention relates to spring stud fasteners, particularly of the one-piece wire type, in which the fasteners consist solely of a single piece of wire bent into a form so that a portion thereof may engage and hold a member to be applied to a supporting structure, while another portion thereof is intended to form the shank of the fastener, the latter portion being shaped to firmly engage the wall or walls of a hole or socket provided in the supporting structure.

In my Patent #1,679,266, granted July 21, 1928, I have disclosed a one-piece wire spring stud fastener including a shank consisting of several arms that are formed to engage the edges of an opening in a perforated sheet metal supporting structure. The fastener of this patent is well adapted to serve the purposes for which it was provided, and can also be used with success in securing members to supporting structures having walls of substantial thickness by causing the arms constituting the shank of the fastener to frictionally engage the wall or walls of the opening, as distinct from the inside edges of the plate-like supporting structure of my patent, as fully described in my application Serial Number 588,029, filed January 21, 1932.

This invention aims to provide a one-piece fastener intended particularly for securing members upon supporting structures of substantial thickness, such as supporting structures made of wood, and to so construct the shank of the fasteners that each arm forming a part of the shank grips the walls of the opening in the supporting structure at substantially diametrically opposite portions thereof, whereby the area of frictional contact between each arm of the shank of the fastener is substantially increased, thereby proportionately increasing the holding power of the fastener.

A further object of the invention is to provide a one-piece spring fastener including one or more arms constructed of inherently resilient material, which arms are formed so that upon the entry thereof in an opening in the supporting structure, said arms are caused to be deflected from one side of an opening in said structure into firm contact with the wall of said opening directly opposite the portion thereof that is first contacted by an arm of the fastener.

A still further object of the invention is to provide a spring fastener including a shank having one or more arms shaped to enter a hole in the supporting structure and to contact with opposite sides thereof and in so doing to be bent between the points of contact whereby the inherent resilience of the bent arm is effective to exert a continuously applied yielding pressure against said points thus increasing the holding power of the fastener.

Still further objects of the invention will appear as a description thereof proceeds with reference to the accompanying drawing in which:

Figures 1, 2 and 3 are respectively front, back, and side elevational views of a preferred embodiment of a fastener including the present invention.

Figure 4 is a plan view of the same fastener.

Figure 5 is a fragmentary sectional view showing the fastener of Figures 1 to 4 in position ready to be inserted in a hole formed in a supporting structure.

Figure 6 is a view similar to Figure 5 showing the fastener in full lines partly inserted in said hole and in dotted lines completely inserted therein.

Figure 7 is a fragmentary view showing the fastener holding a trim panel for an automobile body in position on a supporting structure.

Figure 8 is a sectional view taken on the plane indicated by the lines 8—8 in Figure 7, looking in the direction of the arrows.

Figure 9 is a front elevational view of a modified form of fastener including means to increase the holding action of the fastener when inserted in the socket provided to receive it.

Like reference characters indicate like parts throughout the several figures.

The present invention contemplates the provision of a fastener of the spring type that is capable of firmly holding a member against a supporting structure provided with a hole having relatively smooth walls of relatively great length so that the fastener exerts its holding function by frictionally gripping the relatively smooth walls without extending completely through the hole and engaging the corners of the hole remote from the member secured to the supporting structure.

The fastener of the present invention may be put to very many uses. It is particularly intended for securing automobile or similar trim panels to the interior of automobile bodies or the like, that include wooden supporting members constituting a part of the frame of the body. Essentially, the fastener includes a portion that engages the member to be secured to the supporting structure, and a portion that constitutes the shank of the fastener and is arranged and constructed so that when said shank portion is entered in a hole in the supporting structure a firm pressure is exerted by the latter portion of the fastener against diametrically opposite sides of said hole to cause the shank of the fastener to frictionally, but firmly, grip said walls thus retaining the fastener in the hole and the member firmly fixed upon said supporting structure.

Referring to the drawing, the numeral 10 designates, as a whole, the portion of the fastener that is intended to engage the member secured to the supporting structure, while the numeral 11 designates, as a whole, the shank of the fastener or the portion thereof that is intended to be sprung or entered in a hole in the supporting structure. Preferably, but not necessarily, the fastener is constructed of a single piece of wire as illustrated. The mid-portion of the wire, preferably, forms the portion 10 of the fastener, while the ends of the wire form portion 11. In the preferred embodiment the portion 10 is constructed in the form of a hook so that the fastener may be hooked upon the edge of the material or member that is secured to the supporting structure, the arms of the hook being designated by the numerals 12 and 13. The arm 12 is formed from the mid-portion of the wire, preferably by bending it into the form of a loop, whereas the arm 13 of this portion of the fastener consists of two wire elements 14 and 15 formed by bending the portions of the wire adjacent the ends of the loop 12 rather abruptly downwardly adjacent the ends of the loop, and then inwardly in side by side relation in a plane spaced from the plane of the loop 12. As seen in Figure 4 the elements 14 and 15 are carried from the ends of the loop into contact with each other at 16 and then away from each other to the points 17. The portions of the ends of the wire, from which the fastener is constructed, beyond the points 17 are then turned into planes approximately at right angles to the arms 12 and 13, providing legs 18 and 19 that are relatively widely spaced apart and in approximate parallelism with each other adjacent the arm 13. The legs 18 and 19 are bent into convergent relation at a relatively sharp angle beyond the approximately parallel portions, as shown at 20 and 21. The extreme ends of the legs 18 and 19 are then bent away from each other as indicated at 22 and 23 providing rounded bearing surfaces 24 and 25 for a purpose presently to be described.

The fastener just described has a satisfactory holding power when the shank portion 11 thereof is inserted in a hole having a diameter that is very substantially less than the maximum width of said shank portion 11, before the fastener is inserted in said hole. The operation of the fastener when put to this use is illustrated clearly in Figures 5 and 6 of the drawing, in which 26 designates a suitable supporting structure, which may be of wood, and 27 indicates a hole bored therein having the diameter thereof related to the maximum overall width of the shank portion 11 as above stated. In applying the fastener to the hole 27 in the supporting structure 26 the shank portion 11 thereof is first entered therein, the outwardly turned ends of the wire 22 and 23 readily entering said hole. Pressure is then applied to the fastener causing the convergently disposed portions 20 and 21 of the legs 18 and 19 to engage the outer corner of the hole. As the shank 11 of the fastener enters said hole by the application of pressure in a direction along the length of said shank portion, the convergently disposed portions 20 and 21 exert a wedging action tending to contract the shank portion of the fastener by bringing the legs 18 and 19 closer together. In bringing said legs closer together they are each bent as illustrated in Figure 6 of the drawing between the points 16 at which the elements that carry the legs contact and the points at which said legs bear against the corner of the hole in which they are entered. As illustrated in Figure 3 of the drawing the ends of the legs 18 and 19 as well as the convergently disposed portions 20 and 21 are arranged so that they are not in the same plane, whereby the legs may freely pass each other as the shank of the fastener is contracted in the manner just described. In addition to bending the legs 18 and 19 when the fastener is entered in the hole 27, the engagement of the convergently disposed portions 20 and 21 with the corners of the hole has the effect of deflecting each leg of the shank of the fastener from one side of the hole into contact with the portion of the hole that is diametrically opposite the point at which said legs first contact with the corners of the hole in the supporting structure. The bearing surfaces 24 and 25 on the arms 18 and 19 are thus forced into contact with the opposite sides of the wall or walls in the hole of the supporting structure. As the movement of the shank of the fastener, from the full line to the dotted line position in Figure 6, continues it will be understood that the legs 18 and 19 are bent further thus causing the legs 18 and 19 to be somewhat distorted as the fastener reaches its applied position. Inasmuch as the fastener is constructed of wire, that is bent into form so that each leg is constructed of inherently resilient material, it will be understood that the bending or straightening of the legs 18 and 19 as they are inserted in the holes causes each leg to be put under tension that is continuously effective to exert lateral pressure against the approximately diametrically opposite points of the hole in which the shank of the fastener is inserted. The holding power of the fastener is thus greatly increased, and by constructing the shank portion of the fastener of sufficiently stiff resilient material, a firm holding power can be obtained though the walls of the hole be relatively smooth. It will be observed further that in the completely applied position of the fastener, shown in Figure 7, the surfaces of converging positions 20 and 21 are disposed at a smaller acute angle to the bearing surfaces of the legs than before insertion of the fastener in the hole 27.

As above stated, the fastener just described may be used for many purposes. The portion 10 thereof that is intended to engage the member that is held in position upon the supporting structure 26 being constructed in any form suitable to adapt it to the member to be secured and to the mode in which it is desired to attach the fastener to the member. The portion 10 may be made in the form of a flat head when the fastener is intended for use by passing the shank thereof through an opening in the member to be secured with the head thereof bearing upon the portion of the member adjacent said opening. In order to construct the fastener in this manner it will be understood that the portions 14 and 15 are maintained within the loop 12 rather than inwardly spaced therefrom as illustrated in my Patent #1,679,266.

When the illustrated fastener is used it may be applied for the purpose of securing stiffened reenforced trim panels of automobile bodies after the manner illustrated in Figures 7 and 8 of the drawing. Said panels may each include a foundation or body 28 stiffened at its margins by the application to said margins of reenforcing strips 29 stitched at 30' to said margin adjacent the edge so that the strip is free of attachment at the side remote from said edge. The panel is then covered by a suitable fabric covering 30 that extends around the edges of the foundation and of the reenforcing strips as indicated at 31, being secured in any suitable manner to the foundation and/or reenforcement.

The fastener specifically illustrated and described when used for the purpose of securing said panels, is assembled with respect to the panel by hooking the portion 10 of each fastener on the reenforcement 29 after the panel has been completely constructed. Suitable holes 27 are formed at spaced intervals in the supporting structure 26, and fasteners corresponding in number and in spacing to said holes are hooked upon the panel in the manner just described. The fasteners are assembled with respect to the entire panel before the application thereof to the supporting structure is initiated. After the fasteners have been assembled at intervals around the reenforcements for the panels, as just described, the shank portions of the fastener are preferably successively entered into the holes 27 in the supporting structure, and said shank portions are driven, as by a wooden mallet, into the holes provided to receive them. In driving the shank portions of the fasteners in said holes, the legs constituting said shank portions are caused to each first engage one side of the opening, to be then deflected into contact with the apertures at a point directly opposite the wall of the hole at which they first contact, and upon further insertion of the shank portion of the fastener the legs are bent so as to apply a continuously yielding pressure exerted by each leg against opposite walls of the hole in the supporting structure, thus causing the fasteners to frictionally grip the wall or walls of the hole in the manner above more particularly described.

Instead of relying upon friction alone to hold the fastener in the hole, if desired, the legs 18 and 19 may be provided with teeth 31' as illustrated in Figure 9 of the drawing, said teeth being formed as illustrated so as to present no sharp shoulders in the direction in which the fastener is driven into the hole, but to present relatively sharp shoulders to resist the withdrawal of the fastener from the hole and to cause said legs to have a tendency to bite into the wall of the hole slightly upon attempted withdrawal of the shank of the fastener. The holding power of the fastener may be still further increased by providing a tooth 32 or a number of teeth on the bearing portions 24 and 25 of the shank portion of the fastener so that further resistance to the withdrawal of the shank of the fastener from the hole is prevented by said teeth in cooperation with teeth 31' above described.

The fastener of this invention is particularly adapted to secure a member to a supporting structure of wood or the like in which it is desired to secure the member to a hole having an uninterrupted or smooth wall devoid of shoulders behind which a spring fastener of ordinary type could engage. The fastener can be used to secure members such as panels to supporting structures of any thickness, and it is unnecessary to provide specially shaped holes. On the other hand holes which may be readily bored in the supporting structure to the desired depth can be used. The formation of accurately positioned shoulders is entirely unnecessary, so that identical fasteners may be put to a wide variety of uses in connection with supporting structures of various kinds and thicknesses. While the fasteners provide a firm support for material attached to a supporting structure it will be understood that, when it is desired to remove the member secured by the fastener to the supporting structure, for any purpose the fastener may be withdrawn and subsequently reapplied without injury to the member or to the fastener.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A one-piece wire fastener having the midportion of the wire bent to form a head shaped to engage and hold a member on a supporting structure, and having the ends of the wire bent away from said head to form a shank consisting of two spaced legs that are approximately parallel adjacent the head and that then relatively sharply converge toward the tips of said legs whereby when said shank is entered in a hole having a diameter less than the spacing of the approximately parallel portions of said legs said tips are forced into contact with the portion of the wall defining said hole that is opposite that which is engaged when the converging portion of the same arm first engages said wall when said shank is entered therein.

2. The fastener defined in claim 1 in which said tips of the legs are rounded so that the fastener may be freely driven in said hole.

3. A spring stud fastener designed for insertion in a deep hole in a thick supporting structure comprising a pair of resilient legs each of which comprises a part to continuously engage one side of said hole and another part interconnected to and angularly related to said first part in order to be deflected into contact with the opposite side thereof upon entry of said leg in said hole, each of said legs being provided with means to present substantial resistance to the withdrawal of said legs from said hole.

4. In combination, a thick supporting structure having a deep hole, a spring stud fastener including inherently resilient crossed legs, each having a pair of bearing surfaces resiliently contacting with opposite sides of the wall of said hole.

5. In combination, a wooden or similar supporting structure provided with a deep hole of uniform diameter, and a spring fastener having a shank of a length less than the thickness of said supporting structure and including two bearing portions, one of which has a surface engaging one side of said hole when the fastener is in applied position and the other of which has a surface engaging an approximately diametrically opposite side of said hole when the fastener is in applied position, and a further portion extending across said hole and integrally connecting said two portions within said hole.

6. A spring stud fastener for insertion in a hole in a supporting structure having a depth at least as great as the length of the shank of the fastener including a shank having two inherently resilient legs each having bearing surfaces to simultaneously contact with opposite sides of said hole and a third surface normally disposed at acute angles to said bearing surfaces, and in applied position extending at a smaller acute angle to said surfaces.

7. A headed spring fastener comprising a shank consisting of two legs disposed for movement past each other in parallel planes, said legs being carried respectively by elements disposed approximately at right angles to said legs and forming a part of the head, said elements being in contact and diverging with respect to each other from their point of contact toward said legs, the legs having portions of substantial length in parallelism and other portions more remote from said elements that extend at acute angles to said parallel portions and terminate in rounded ends beyond said last named portions.

8. A spring stud fastener designed for insertion in a hole in a supporting structure having a depth at least as great as the length of the shank of the fastener, comprising a shank consisting of a pair of inherently resilient deformed legs, each of which includes a part shaped to parallel and engage one side of said hole and another part designed to bear upon the other side of said hole, said last named part being angularly disposed with respect to said first part and having a length exceeding the diameter of the hole so that each leg upon engagement of said first named part with one side of said hole, is deflected into resilient contact with the opposite side thereof.

9. A spring stud fastener having a shank formed for insertion in the hole of a supporting structure having a depth at least as great as the length of said shank, said shank including a pair of inherently resilient legs which in applied position are disposed in crossed relation and each provide bearing surfaces simultaneously contacting with opposite sides of said hole, the parts of said legs connecting said surfaces, each having a length exceeding the diameter of said hole.

10. In combination, a thick supporting structure provided with a hole presenting a deep fastener receiving socket, and a spring fastener having a shank of a length less than the thickness of said structure entered in said hole and including a pair of spring legs that each simultaneously contacts with opposite portions of the wall defining said hole, the portions of said legs between their points of contact with said wall being flexed during the entry of said legs in said hole so that a continuously effective spring pressure is exerted against the portions of said wall with which said legs contact.

11. In combination, a thick supporting structure provided with a hole presenting a deep fastener receiving socket, and a spring fastener having a pair of crossed spring legs sprung in said hole and each simultaneously contacting with the wall thereof at approximately opposite points to hold said member in place by frictional engagement of said legs with said wall.

12. A one-piece wire fastener having a portion of the wire bent to provide means to engage and hold a member on a supporting structure, and a shank portion to enter a deep hole in a supporting structure having a thickness exceeding the length of said shank portion, consisting of parts of the wire bent to provide a pair of bent crossed legs, each providing bearing surfaces to yieldingly simultaneously contact with opposite sides of said hole, and each leg having a part connecting said bearing surfaces that has a length exceeding the diameter of said hole.

BION C. PLACE.